Oct. 30, 1951     H. MARKE     2,573,647
FISHING ROD GUIDE
Filed Aug. 29, 1949
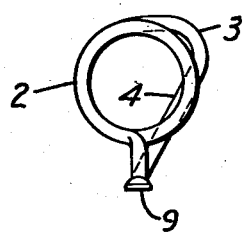
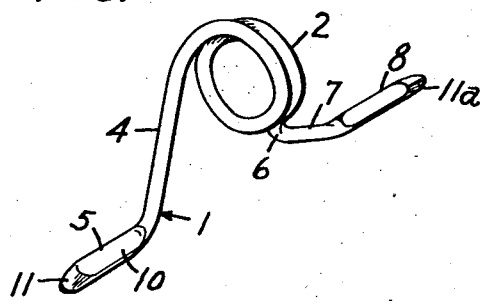
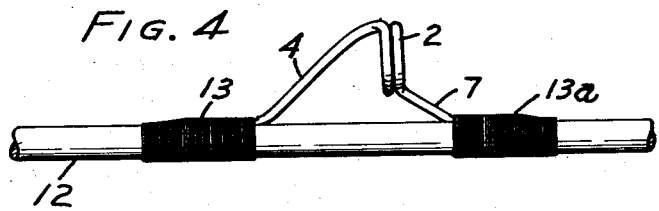
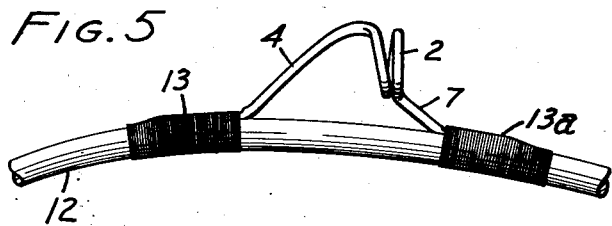
INVENTOR.
HANS MARKE,
BY
*D. Gordon Angus*
ATTORNEY.

Patented Oct. 30, 1951

2,573,647

UNITED STATES PATENT OFFICE 2,573,647

FISHING ROD GUIDE

Hans Marke, Burbank, Calif., assignor to Aetna Products and Manufacturing Co., Burbank, Calif., a corporation of California Application August 29, 1949, Serial No. 112,943

2 Claims. (Cl. 43—24)

This invention relates to fishing rod guides and has for its principal object to provide a simple flexible guide which will enable the rod to exert its maximum springing action and which will not foul the line.

As is well known, a fishing rod is normally provided with a number of aligned guides placed at intervals in alignment along the length of the rod up to the tip, to act as a guide for the line travelling to and from the reel. It is desired that the guides shall present a minimum amount of friction or obstruction to the travel of the line to and from the reel even under conditions when the rod is flexed; and for this reason it is a common practice to provide guides of different diameters and spacing from the rod along the length of the rod.

It has heretofore been a common practice to construct such guides in the form of rings which are soldered as by silver soldering, to a frame which is bound or fastened to the rod. Such constructions have the disadvantage of not only being relatively complex and expensive, since they are made of more than one piece and require soldering or other suitable fastening, but also the rings tend to become displaced; and furthermore, the supports have tended to resist flexing of the line and create strains on the bindings.

Furthermore, the formerly known non-resilient type of guide tends to resist the flexing of the rod. This has the double disadvantage of putting flat spots in the rod at the places where the guides are bound and also of putting undesired great stress on the bindings which tends to shorten their life.

In accordance with my present invention, I avoid the disadvantages of previously known types of fishing rod guides by the provision of a single-piece construction which is relatively simple and inexpensive to manufacture and to apply to the rods. My novel guide is made of a resilient wire-like material comprising both the guide itself and its support and footings; and the wire is provided with a springy coil in a generally circular form, the ends of the coil being brought down to the footings. This avoids strains and flat spots on the rod.

In accordance with a preferred feature, the footings at the front and back ends are arranged substantially collinear with each other and the coil or guide portion is raised somewhat from the footings so as to provide spacing from the rod.

According to another feature, my guide is rendered substantially foul-proof by carrying a length of the guide support between the coil and the footing in an oblique and slanting direction so that the line cannot hitch around the guide and create a snarl. This is done by bringing out an upper part of the coil laterally away from the side of the complete coil, and curving this part to meet the said oblique and slanting length of the guide support.

The footings of the guide are preferably flattened at the bottom to conform with the surface of the rod and suitably feathered at the top to provide convenient surfaces for setting the guides and binding them.

By reason of this arrangement, the guides will readily flex with the flexing of the rod without producing undue strain on the binding or undesired flat spots on the rod.

The foregoing and other features of my invention will be better understood from the following detailed description and the accompanying drawing of which:

Fig. 1 shows a plan view of a guide in accordance with my invention;

Fig. 2 shows an end view of the guide;

Fig. 3 is perspective view of the guide;

Fig. 4 is a side elevation view showing the guide attached to a fishing rod; and Fig. 5 shows the rod of Fig. 4 flexed, illustrating the flexibility of the guide.

Referring to the drawing, the fishing rod guide is made of a resilient wire or wire-like material 1, such as spring tempered metal, which is preferably Monel metal; and is provided with a circular coil 2 which may be of about a turn and a half, that is, a complete loop plus a half loop at an intermediate position or portion in its length; and the loop plus the fraction of a loop forming the coil are preferably spaced together or close together. At its upper and rearward end the half loop is brought out laterally beyond the circumference of the loop circle 2 to a position 3 from where it is slanted downwardly and rearwardly as a substantially straight section line 4, to the rear footing 5. Thus, the complete coil 2 has an upper part extension 3 thereof which is curved laterally away from and above the side (the righthand side in Fig. 2) of the complete coil over which this upper part 3 extends; and curves around to merge into the straight section 4. The forward end of the complete loop terminates substantially at the bottom of the circle at 6 and from there is carried along a substantially straight section 7 extending to the forward footing 8. Since the portion 4 is oblique with reference to the portion 7, in the end view (Fig. 2), the portion 4 may be called oblique. The section 4 intersects the plane passing through the footings 5 and 8 and the diameter of the coil.

The two straight end portions or footings 5 and 8 extend substantially in substantial alignment with each other in the fore and aft direction and the bottoms of the footings are substantially flattened as shown at 9 (Fig. 2), so that they will conform substantially with the surface of the fishing rod. The tops of the footings are likewise flattened somewhat as shown at 10 so that the flattened tops and bottoms of the footings can be feathered to substantially feather edges at their extremities as shown at 11 and 11a. This will assist in applying a smooth binding to the footings. The intermediate portion connecting the inner ends of the straight portions 5 and 8 is constituted by the other parts of the guide described above, namely the complete coil 2 having its lower terminus merging into the straight section 7 which is shorter than the straight section 4 which merges into the lateral extension 3. It is noted that the straight section 4 of the intermediate portion of the guide lies in a plane at an acute angle to a plane which includes the other straight portions 5 and 8 and extends through the diameter of the coil 2. Furthermore, it is noted that the straight section 7 is at an acute angle to the axis or line running through the straight end portions 5 and 8.

According to a usual practice, the surface of the guide will be coated with some kind of a coating, usually a corrosion-resistant coating which, for example, may be a bright chrome or a heavy hard chrome, or a black nickel, accordingly as may be desired for different uses or desires. This coating will tend to take the sharpness off of any really sharp edge which may be left at the points of the footings, so that the footings will appear substantially as shown in the drawing.

The manner of applying the guide to a fishing rod is shown in Fig. 4 which illustrates a section of a round rod 12. It will be understood, of course, that the guide could be applied in the same maner to a flat-sided rod such as a split bamboo. According to the usual practice, a binding or serving 13 and 13a is wrapped around the rod and over each footing. The details of winding this binding need not be set forth at any greater length herein as it is well understood in the art and the binding itself forms no part of the present invention.

An outstanding feature of the construction of this guide is its great resilience enabling the guide to flex and spring with the rod action. This is illustrated in Fig. 5 which shows the rod of Fig. 4 flexed. As can be seen from this figure, the two footings of the guide readily assume the position non-parallel with each other caused by the flexing of the rod and without acting appreciably to restrain the rod from flexing. This is inherent in the coil 2 which readily introduces a spring action so that the top of the spring can pull apart to accommodate the non-parallel movement of the footing. The benefit of this is apparent because there is no undue strain put on the bindings 13 and 13a such as is commonly imposed on the bindings for the guides of ordinary non-resilient types of guides. Moreover, this resilience avoids the occurrence of flat spots on the rod at the positions of the guides; for my novel guide simply moves with bending of the pole, and the pole can thus undergo its maximum flexing action. In fact, the resilience of the guide even assists to some extent the spring of the rod; thereby insuring great casting distances.

The novel construction of my guides, furthermore, tends to make them practically foulproof, in that the line cannot easily loop around the guide. It is a fairly common experience when casting, for the outgoing line to travel other than in exactly a straight line in going through the guides; the line sometimes tends to belly or form loops in back of or between the guides. When this bellying of the cast line exists to a considerable degree, a loop or half-hitch of the line has not infrequently been known to form around the guide and thereby snag or impede the free travel of the line, thereby spoiling the cast. By the shape of my present guides, however, this fouling tendency during casting is substantially eliminated. In the event the line does tend to half-hitch, the looping part of the line at the guide which would tend to cause the trouble, occurs near the base of the portion 4; and owing to the oblique and slanting direction of portion 4, the looped hitch will simply travel on up element 4 to the top of the ring 3 where the loop will drop out.

Other advantages of the construction will also become manifest. For example, by reason of the use of the wire material 1 for the construction, the line itself can only be in engagement with a relatively small contact area on the round wire, thereby cutting down resistance and minimizing line friction. This is known to allow considerably greater distance in casting. Experts, for example, have reported up to twenty percent greater distance in casting with the use of my novel guides, than in the use of previously known types of guide.

An important feature of the construction resides in the positioning of the loop 2, a substantial distance away from the rod. By reason of this, the loop will not bind against the rod even though the latter be severely flexed, as shown in Fig. 5. If such jamming of the loop against the rod should occur, it would put a strain on the footings and their bindings, and tend to produce the undesirable effects on the bindings and tend to produce flat spots on the rod which, as mentioned above it is desired to avoid.

It will be understood that guides in accordance with my novel construction can be made, and ordinarily will be made, in a considerable number of sizes, the selection of which will vary with different types of rods and purposes and for different positions on the rods. For example, rods used for deep-sea game fishing require very large sizes and those for other types of deep-sea fishing would also require fairly large guides. Rods for fly-casting and the like would utilize much smaller and lighter weight guides.

It will be understood that the construction according to my invention is not necessarily limited to all the details of construction shown in the drawing, which is given by way of illustration rather than of limitation; and it will be recognized that modifications within the scope of the invention may occur to those skilled in the art without departing from the invention. The invention is not limited except in accordance with the scope of the appended claims.

I claim:

1. A fishing rod line guide comprising a unitary length of resilient wire including two straight end portions in substantial alignment and an intermediate portion connecting the inner ends of the straight portions, said intermediate portion including a first straight section and a section composed of at least one complete coil having an upper part extension thereof curved laterally away from and above the side of the complete coil over which said upper part extends and merging into the straight section of the intermediate portion, the complete coil having the lower terminus thereof merging into a straight section shorter than said first straight section and connected to one of the straight end portions and being at an acute angle to the axis of the straight end portions, the first straight section of the intermediate portion lying in a plane at an acute angle to a plane including all the other straight portions and the diameter of the coil.

2. A fishing rod line guide comprising a unitary length of resilient wire including two straight end portions in substantial alignment and an intermediate portion connecting the inner ends of the straight portions, said intermediate portion including a first straight section and a section composed of at least one complete coil having an upper part extension thereof curved laterally away from and above the side of the complete coil over which said upper part extends and merging into the straight section of the intermediate portion, the complete coil having the lower terminus thereof merging into a section shorter than said first straight section and connected to one of the straight end portions and being at an acute angle to the axis of the straight end portions, said first straight section of the intermediate portion lying in a plane at an acute angle to a plane including all the other straight portions and the coil diameter.

HANS MARKE.

REFERENCES CITED

The following references are of record in the file of this patent:

UNITED STATES PATENTS

| Number | Name | Date |
|--------|------|------|
| 396,707 | Parker | Jan. 22, 1889 |
| 2,398,862 | Sarkisian | Apr. 23, 1946 |